United States Patent [19]
Takayama et al.

[11] Patent Number: 6,138,196
[45] Date of Patent: Oct. 24, 2000

[54] COMMUNICATION SYSTEM FOR PROVIDING DIGITAL DATA TRANSFER, ELECTRONIC EQUIPMENT FOR TRANSFERRING DATA USING THE COMMUNICATION SYSTEM, AND AN INTERFACE CONTROL DEVICE

[75] Inventors: Nobutoshi Takayama, Yokohama; Masamichi Itou, Tokyo, both of Japan

[73] Assignee: Canon Kabushiki Kaisha, Tokyo, Japan

[21] Appl. No.: 09/414,319

[22] Filed: Oct. 7, 1999

Related U.S. Application Data

[62] Division of application No. 08/917,295, Aug. 25, 1997, Pat. No. 5,991,842.

[30] Foreign Application Priority Data

Aug. 27, 1996 [JP] Japan ................................. 8-225183

[51] Int. Cl.[7] .......................... G06F 13/00; G06F 13/42
[52] U.S. Cl. .................. 710/105; 710/104; 710/106; 710/11; 710/62
[58] Field of Search ........................ 710/105, 104, 710/106, 11, 62, 101, 129; 709/238, 253; 370/463, 912; 379/88.13

[56] References Cited

U.S. PATENT DOCUMENTS

| | | | |
|---|---|---|---|
| 5,506,965 | 4/1996 | Naoe | 395/200.39 |
| 5,517,647 | 5/1996 | Kamada et al. | 355/728 |
| 5,519,832 | 5/1996 | Warchol. | |
| 5,691,714 | 11/1997 | Mehnert et al. | 340/870.05 |
| 5,935,208 | 10/1999 | Duckwall et al. . | |
| 5,991,842 | 11/1999 | Takayama . | |
| 6,038,625 | 3/2000 | Ogino et al. . | |

*Primary Examiner*—Gopal C. Ray
*Attorney, Agent, or Firm*—Fitzpatrick, Cella, Harper & Scinto

[57] ABSTRACT

An electronic equipment for communications with other nodes via a serial bus interface. The electronic equipment has a plurality of functions, and stores a plurality piece of information representative of the plurality of functions. The communication system selectively reads the stored information and realizes the function corresponding to the read information. Accordingly, communications suitable for each function can be executed via the serial bus interface. An interface control device used with an electronic equipment having a plurality of functions stores a plurality piece of information representative of the plurality of functions. The communication system selectively reads the stored information and realizes the function corresponding to the read information. Accordingly, the electronic equipment can perform communications suitable for each function.

11 Claims, 10 Drawing Sheets

OFFSET ADDRESS

| Offset | Block | |
|---|---|---|
| 0400h | BUS_INFO_BLOCK | ⎫ |
| 0414h | ROOT_DIRECTORY | ⎬ CR |
| 0xxxh | UNIT_DIRECTRY | ⎭ |

| 1xxxh | COMMAND REGISTER & STATUS REGISTER |

COMMUNICATION SYSTEM FOR PROVIDING DIGITAL DATA TRANSFER, ELECTRONIC EQUIPMENT FOR TRANSFERRING DATA USING THE COMMUNICATION SYSTEM, AND AN INTERFACE CONTROL DEVICE

This application is a division of application Ser. No. 08/917,295 filed Aug. 25, 1997, now U.S. Pat. No. 5,991,842.

BACKGROUND OF THE INVENTION

1. Field of the Invention

The present invention relates to an interface control device, an electronic equipment, and a communication system, and more particularly to a communication system for digital data transfer using a serial bus interface, an electronic equipment for digital data transfer using such a system, and a control device for controlling such a system.

2. Related Background Art

With the development of recent multimedia techniques, various types of data in various formats can be transferred via one digital I/F (interface) system under various communication protocols.

There is an equipment capable of using only one communication protocol although it has a plurality of functional units, in which each unit can be externally controlled and can transfer data to and from external devices. One of digital I/F bus systems of this kind is an IEEE 1394 serial bus.

In order to deal with nodes having various functions, the IEEE 1394 serial bus is generally provided with, in addition to a protocol common to IEEE 1394, other different communication protocols. In this specification, a common protocol independent from functional units of each equipment, although it is specific to each serial bus such as IEEE 1394 serial bus, is called a fundamental protocol, whereas a protocol dependent upon each functional unit is called a subsidiary communication protocol.

Specifically, even for digital data communications in conformity with the fundamental protocol of a digital I/F bus system, it is generally necessary that a subsidiary communication protocol defined for each node terminal (I/F terminal) matches the protocol of the communication partner, and the communication partner is required to have means for converting the format of received data into a format usable at the communication partner.

The subsidiary communication protocol is generally standardized in accordance with the genre (category) of each equipment or its unit. Therefore, each node has been generally configured as an equipment compatible with a single subsidiary communication protocol.

Definition (definition of node information) of an equipment as viewed from a digital I/F bus has been difficult to generate if a plurality of functions provided by the equipment cannot be operated at the same time, or if the unit configuration or the subsidiary communication protocol changes because of connecting a new unit or attachment.

Even if an equipment is an image input equipment having only a single function, the input image may be used in a different manner at the communication partner. In such a case, it is desired that subsidiary communication protocols different for each use type such as displaying, recording and printing are separately prepared. It is also necessary to consider that a different subsidiary communication protocol may be used by each manufacture of the equipment, even if both the function and use type are the same.

SUMMARY OF THE INVENTION

The invention has been made under the above circumstances, and aims at configuring a communication system while considering a node having various functions and various use types of a digital interface.

It is another object of the present invention to provide an electronic equipment and interface control device capable of communications with various nodes via various interfaces.

In order to achieve the above objects of the invention, an electronic equipment of one embodiment has a plurality of functions and stores a plurality piece of information representative of a plurality of functions. The communication system selectively reads the stored information and realizes the function corresponding to the read information. Accordingly, communications suitable for each function can be executed via the digital serial bus interface.

According to another embodiment of the invention, an interface control device used with an electronic equipment having a plurality of functions stores a plurality piece of information representative of the plurality of functions. The communication system selectively reads the stored information and realizes the function corresponding to the read information. Accordingly, the electronic equipment can perform communications suitable for each function.

An electronic equipment or interface control device according to another embodiment of the invention, selectively reads information from another equipment which stores information on a plurality of functions or information on a plurality of subsidiary communication protocols. Therefore, the communication system can perform communications most suitable for each function.

A communication system of the invention stores a plurality of information representative of a plurality of functions provided by each electronic equipment, and selectively reads the information so that the function corresponding to the read information can be realized at the electronic equipment and optimum communications can be performed.

The other objects and features of the invention will become apparent from the following detailed description of embodiments when read in conjunction with the accompanying drawings.

DETAILED DESCRIPTION OF THE PREFERRED EMBODIMENTS

The invention will be described by using only its preferred embodiments and with reference to the accompanying drawings.

First, a system on which the embodiments are based will be described, this system being a communication system between a plurality of electronic equipments interconnected by serial busses of IEEE-1394-1995 (hereinafter simply called 1394 serial busses).

Communication systems using 1394 serial busses have been proposed as communication systems for multiplex transfer of digital data and control data via digital busses to and from various types of digital equipments such as digital video tape recorders (hereinafter called VTRs) and digital television receivers (hereinafter called TVs).

The 1394 serial bus will be briefly described.

Figure 1:
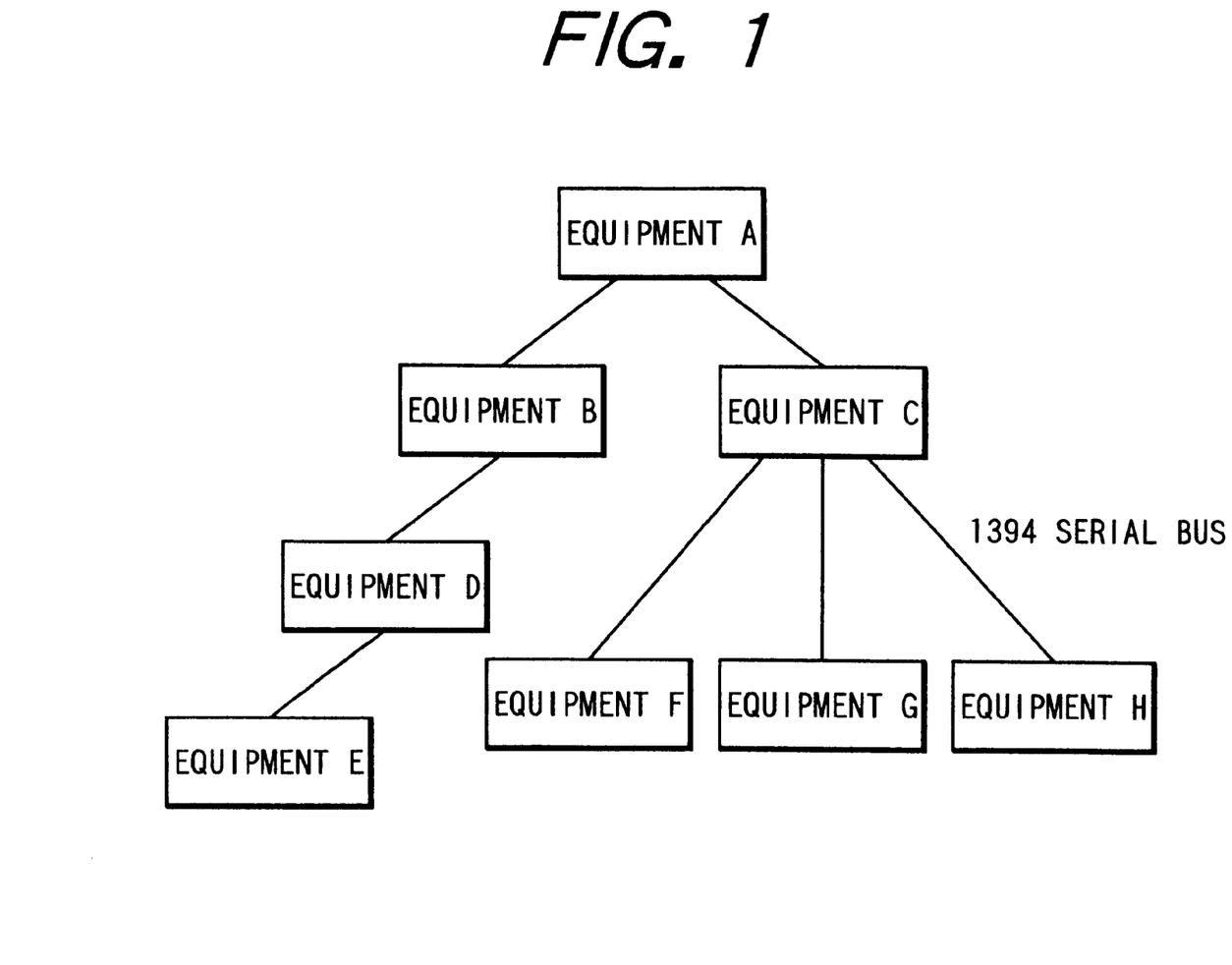
FIG. 1 is a diagram showing an example of a communication system configured by using a serial bus of IEEE 1394.

FIG. 1 shows an example of a network system configured by using 1394 serial busses. This system has equipments A, B, C, D, E, F, G and H and twist pair cables of 1394 serial busses interconnecting A and B, A and C, B and B, D and E, C and F, C and G, and C and H. These equipments A to H may be PCs, digital VTRs, DVDs, digital cameras, hard disks, printers, monitors, and the like.

Interconnection between these equipments can use both a daisy chain scheme and a node branch scheme at the same time, and provides a high degree of connection freedom.

Each equipment has a unique ID so that all the equipments interconnected by 1394 serial busses in one network can be identified. The digital equipments are sequentially connected by a single 1394 serial bus cable, and each equipment provides a repeater function to form one network. A Plug & Play function, which is characteristic of the 1394 serial bus, allows automatic recognition of an equipment and its connection state when it is connected by a cable to the network.

Also in the system shown in FIG. 1, when an equipment is disconnected from the network or a new equipment is added thereto, automatic bus resetting is performed to reset the network configuration and reconfigure a new network. With this function, it is possible to always set and recognize the network configuration at any given time.

The data transfer rates of 100/200/400 Mbps are available, and an equipment having a higher transfer rate supports a lower transfer rate for data transfer compatibility.

The data transfer mode includes an asynchronous transfer mode and an isochronous transfer mode. In the asynchronous transfer mode, asynchronous data (hereinafter described as Async data) such as control signals is transferred, whereas in the isochronous transfer mode, isochronous data (hereinafter described as Iso data) such as real time video data and audio data is transferred. These Async data and Iso data are transferred in a mixed state in each cycle (generally one cycle is 125 μs) after a cycle start packet (CSP) indicating a cycle start is transmitted, while giving the Iso data a priority over the Async data.

Figure 2:
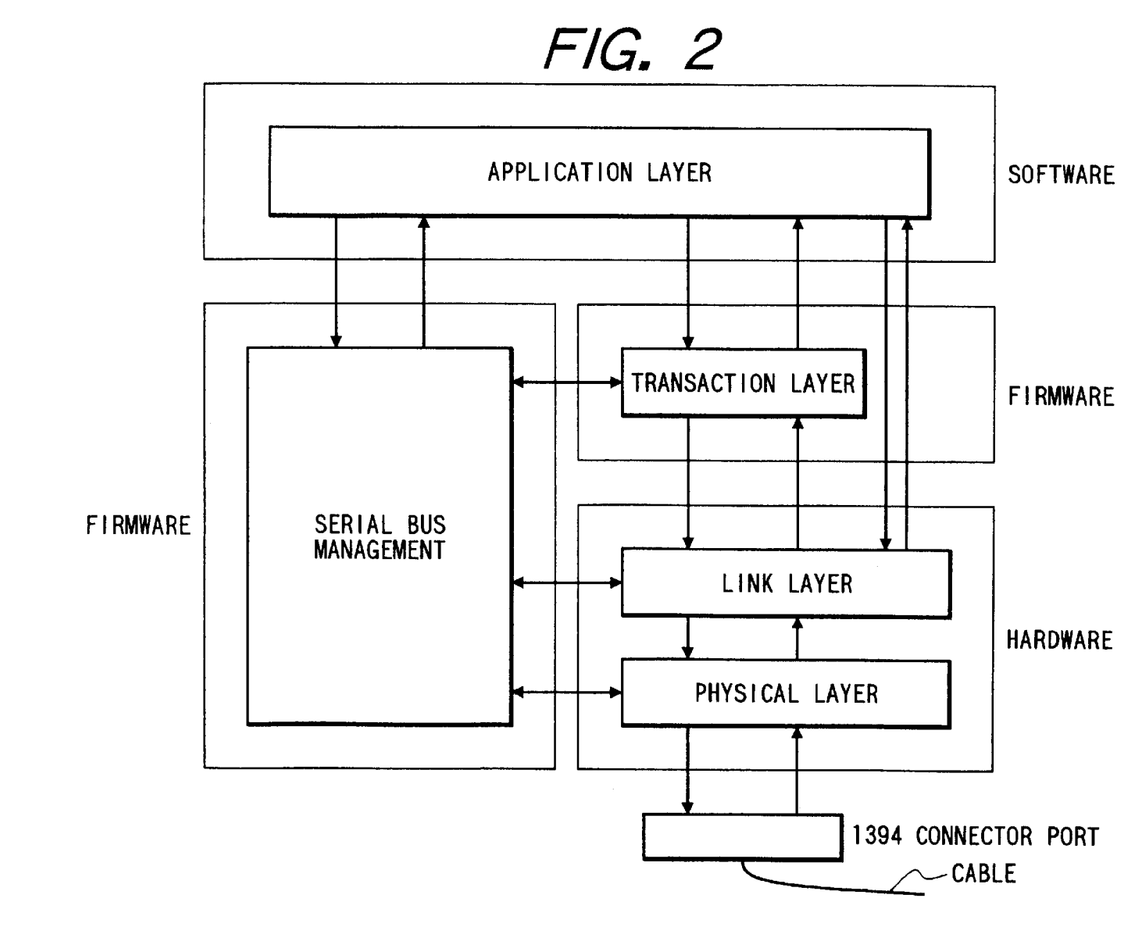
FIG. 2 is a diagram showing the layer structure of a serial bus of IEEE 1394.

FIG. 2 is a schematic diagram showing the functional structure of the 1394 serial bus.

As shown in FIG. 2, the 1394 serial bus is configured as a layer (hierarchical) structure. The constituent at the lowest physical level is a 1394 serial bus cable whose connector is connected to a connector port. At the level higher than this connector port, a physical layer and a link layer are provided as hardware.

This hardware portion is substantially an interface chip. The physical layer of the hardware portion is used for coding, connector control and the like, and the link layer is used for packet transfer, cycle time control and the like.

A transaction layer as firmware is used for the management of transfer data (transaction), and issues commands such as data read and write. A serial bus management manages the connection state and ID of each connected equipment for the node control and network configuration management.

The functions of a bus manager and an isosynchronous resource manager are included in this serial bus management. These hardware and firmware are the fundamental constituents of the 1394 serial bus. Namely, the fundamental protocol of the 1394 serial bus described previously is configured by the firmware up to this transaction layer.

On the other hand, an application layer in a software portion is made of software defined by the above-described subsidiary communication protocols, and changes with each software. Namely, this application layer defines what type of data is transmitted over the 1394 serial bus.

Figure 3:
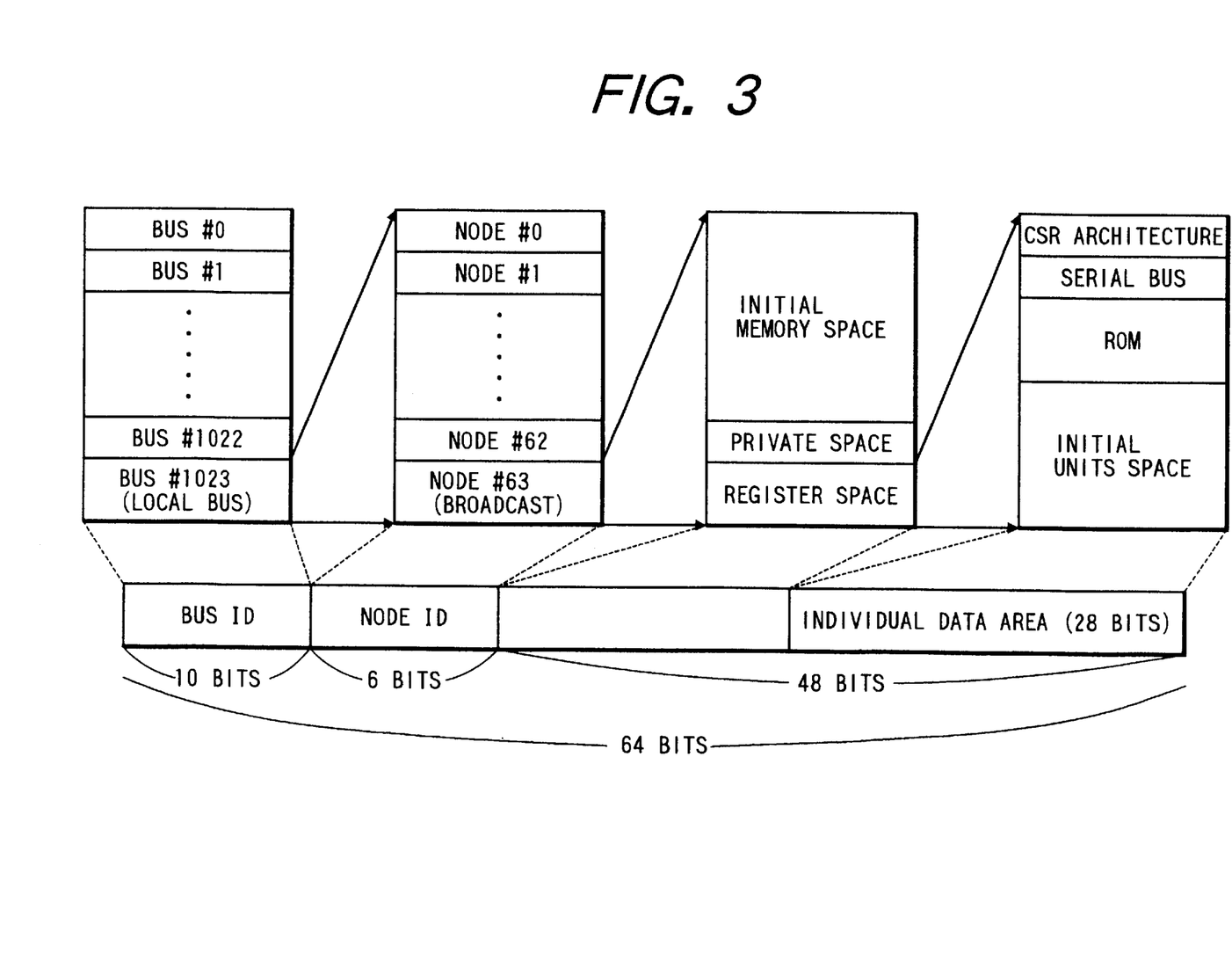
FIG. 3 is a diagram illustrating an address space allocation of a serial bus of IEEE 1394.

Next, with reference to FIG. 3, addressing of the 1394 serial bus will be described. As shown, an address space of a 64-bit width in conformity with IEEE 1212 regulations is defined for the 1394 serial bus. The first 10 bits of the 64-bit address are called a bus ID which is used for the discrimination between busses. The next 6 bits are called a node ID which is used for the discrimination between equipments. The remaining 48 bits are used as an address space which can be used solely by each equipment.

The 48-bit address space is further divided into a 20-bit field and a 28-bit field. An area represented by "FFFFF" of the first 20 bits is a register space which is used for information exchange between equipments.

The first 512 bytes of the register space include a kernel of a known CSR architecture, and the next 512 bytes are used as a serial bus register. The specific contents of these areas are well known and the detailed description thereof is omitted. These areas and the next 1024-byte configuration ROM and a portion of a unit space are implemented on each equipment.

Figure 4:
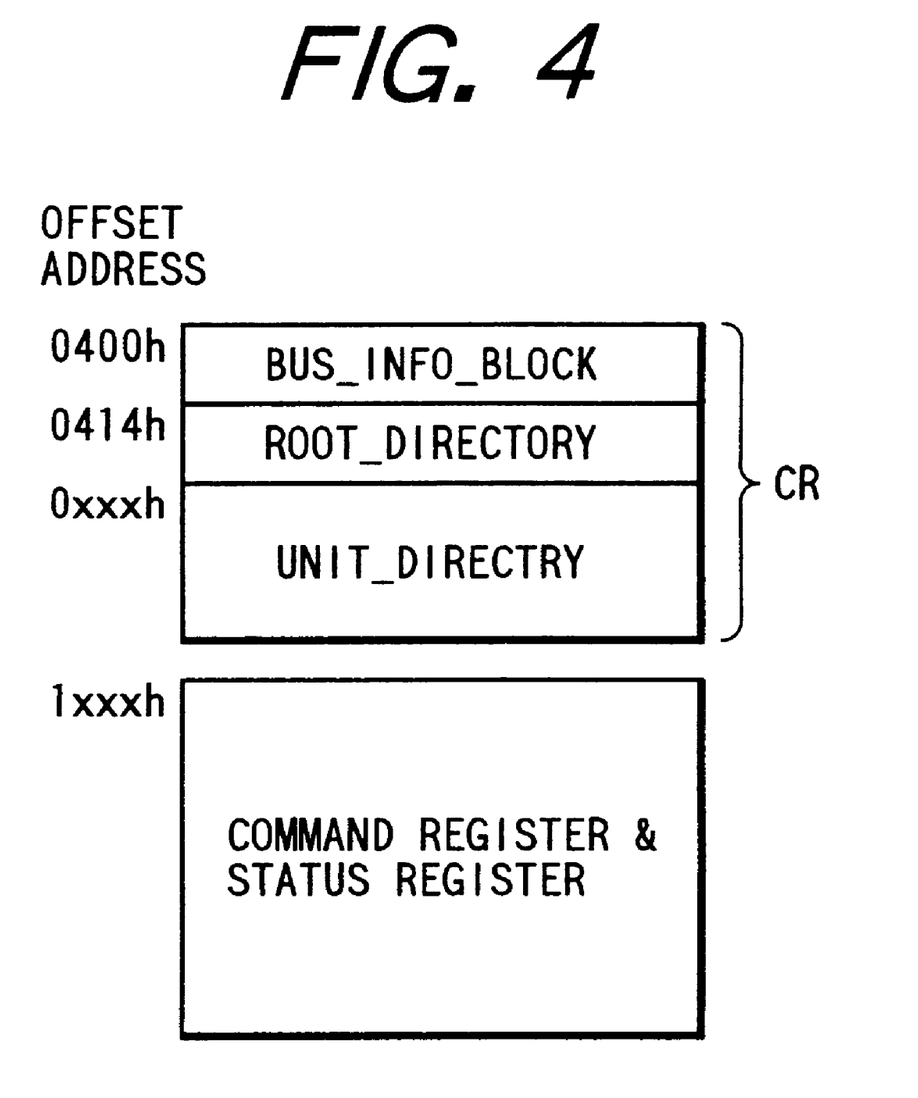
FIG. 4 is a diagram showing the contents of a configuration ROM, addresses being allocated in the manner illustrated in FIG. 3.

The configuration ROM is structured, for example, as shown in FIG. 4 in order to describe the functions of each node. An offset address shown in FIG. 4 indicates a relative address from "FFFFF0000000", and the configuration ROM is located from "FFFFF0000400".

A bus information block (indicated in FIG. 4 by Bus_info_block) stores data such as an ID of an equipment supply company. A root directory (indicated in FIG. 4 by Root_directory) stores information specific to each node and a storage location of the next unit directory (indicated in FIG. 4 by Unit Directory). The unit directory hierarchically stores data representative of the functions of each equipment, data representative of usable subsidiary communication protocols, and other data.

An example of a communication system according to the present invention will be described.

Figure 5:
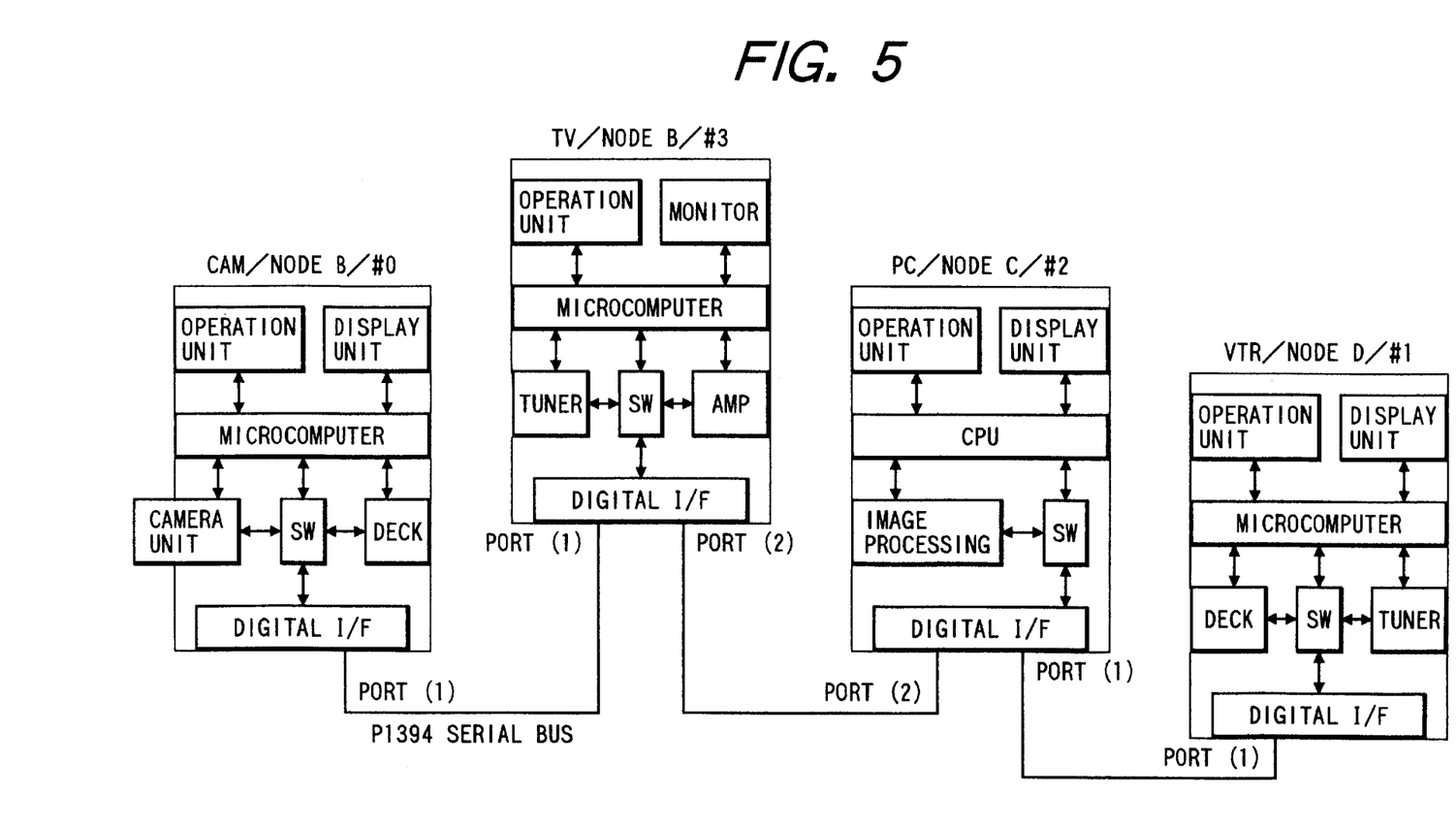
FIG. 5 is a diagram showing the configuration of a communication system according to an embodiment of the invention.

FIG. 5 shows an example of a communication system according to the present invention.

The system shown in FIG. 5 is provided with digital equipments including: a PC (personal computers), a TV, a VTR, and a camera/recorder (hereinafter called a CAM) having a function of picking up a moving image and a still image. 1394 serial buses connect CAM and TV, TV and PC, and PC and VTR. Each of these digital equipments has a function of repeating digital data and control data on the 1394 serial bus.

A cable of a 1394 serial bus is constituted of three sets of shielded paired wires. Paired wires of each set-are used for transfer of protocol signals and data and for supply of electric power. Even if the system has an equipment whose power source is turned off, the operation of the whole system is ensured.

The fundamental structure of each digital equipment, for example, VTR is constituted of: a deck unit; a tuner unit; an operation unit used as user interface; a display unit; a microcomputer for the control of the whole operation, for the generation of communication packets, for the storage of addresses, and the like; a digital interface (digital I/F) unit of 1394 serial buses; and a switch unit for switching between the deck unit, tuner unit, and digital I/F unit. The fundamental structure of TV is constituted of a monitor unit and an amplifier unit in place of the display unit and deck unit of VTR. The fundamental structure of CAM is constituted of a camera unit in place of the tuner unit. The fundamental structure of PC is constituted of a CPU, an operation unit, and an image processing unit, and similar to other digital equipments, of a switch unit and a digital I/F unit.

Figure 6:
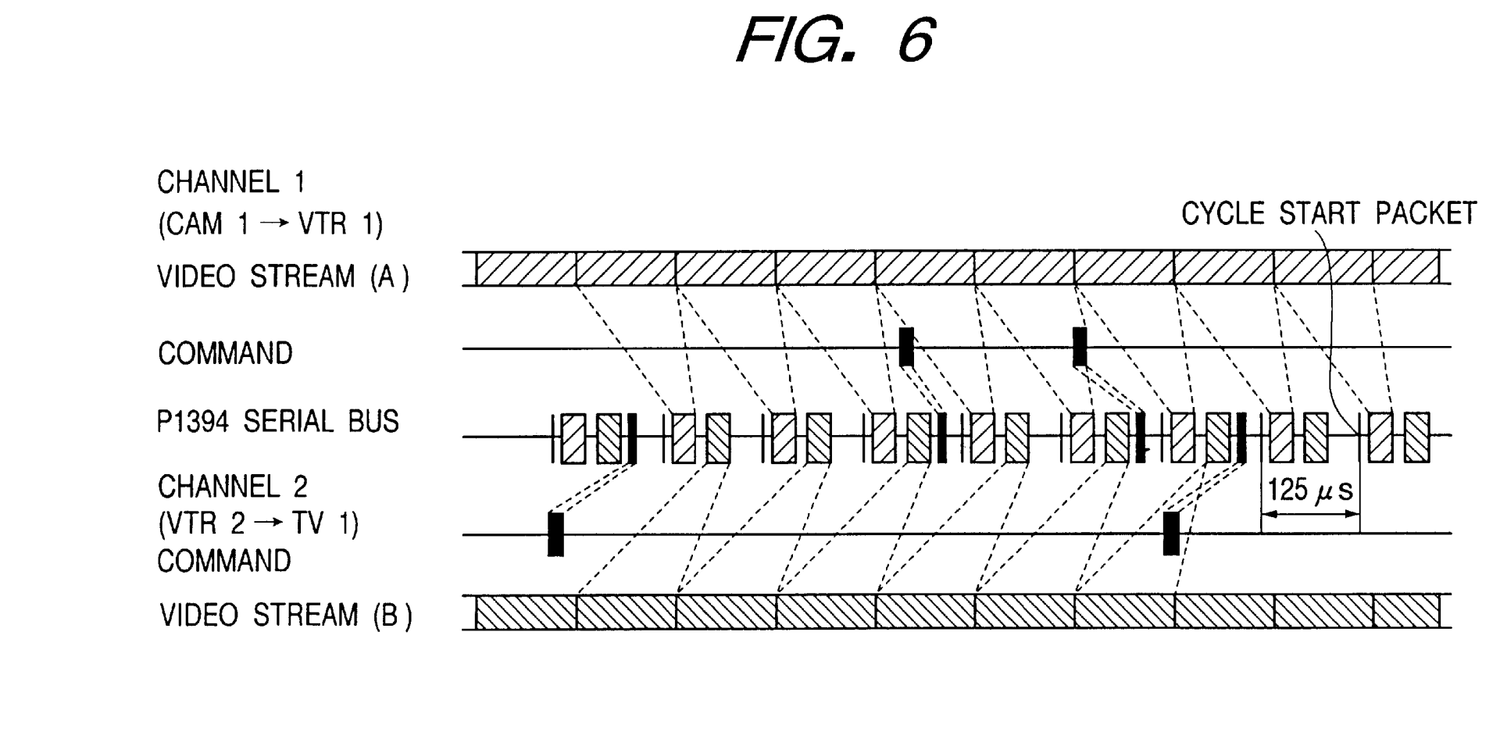
FIG. 6 is a diagram illustrating communication cycles of the system shown in FIG. 5.

Communications are performed by using 1394 serial buses at a predetermined communication cycle (125 $\mu$s) as illustrated in FIG. 6. Time sequential data such as video data and audio data is transmitted through isochronous communication which ensures a transmission bandwidth at a predetermined data rate, and control data such as control commands is transmitted through asynchronous communication when it becomes necessary.

In such communications, at the start of each communication, a cycle start packet is transmitted, and thereafter packets are transmitted for a predetermined period for isochronous communication.

Packets for isochronous communication are assigned specific channel numbers so that isochronous communication for a plurality of channels can be performed at the same time. For example, assuming that communication from CAM to VTR is assigned a channel number "1", CAM transmits isochronous communication packets of the channel number "1" immediately after the cycle start packet is transmitted. VTR monitors packets on the bus and picks up packets having the channel number "1" so that isochronous communication between CAM and VTR can be realized.

Similarly, assuming that communication from TV to PC is assigned a channel number "2", each packet of the channel number "2" is transmitted over the bus after each packet of the channel number "1" so that isochronous communication for the channels "1" and "2" can be executed in parallel.

After all isochronous communication packets are transmitted in each communication cycle, the following period until the next cycle start packet is received, is used for asynchronous communication.

Next, bus management allowing the bus system operation will be described.

An equipment operating as a bus manager first retrieves the information on the network configuration and the connection state of all nodes, and gives the definition of each node ID and controls isochronous communication.

In the communication system described above, when a power is turned on, a new digital equipment is connected, or any equipment is disconnected, topology is automatically set by assigning each equipment (node) a node ID (physical address such as #0, #1, #2 and #3 shown in FIG. 5) in accordance with the new interconnection state, as in the following procedure which uses an addressing program and an address table stored in the memory of the microcomputer.

The node ID assigning procedure will be briefly described. This procedure is composed of determination of a system hierarchical structure and assignment of a physical address of each node.

In this example, for the digital equipments described above, it is assumed that TV is a node A, CAM is a node B, PC is a node C, and VTR is a node D.

Each node notifies a partner node connected by the 1394 serial bus that the partner is a parent. In this case, the first notice has a priority. The parent/child relationship of this system is finally determined, namely, the hierarchical structure of the system and a root node which is not a child of any node are determined.

Specifically, in the example shown in FIG. 5, the node D notifies the node C that the node C is a parent, and the node B notifies the node A that the node B is a parent. If the node A notifies the node C that the node C is a parent and the node C notifies the node A that the node A is a parent, the first notice has a priority and if the notice by the node C is faster, the node A is a parent of the node C. In this case, the node A is not a child of any other node and becomes a root node.

After the parent/child relationship of the digital equipments is determined in the above manner, physical addresses are assigned. The basics of physical address assignment are that a parent node gives a child node an address assignment permission and that each child node starting from the node connected to a younger port number is given an address assignment permission.

In the parent/child relationship determined as in the case of FIG. 5, the node A first gives the node B an address assignment permission. Therefore, the node B gives itself a physical address #0. This is notified to the bus to broadcast the effect "physical address #0 already assigned" to all other nodes.

Next, the node A gives the node C an address assignment permission, and then the node D which is a child of the node C is given an address assignment permission. Therefore, the node D gives itself a physical address #1 next to the physical address #0, and notifies this effect to the bus.

Thereafter, the node C assigns itself a physical address #2 and notifies this effect to the bus. Lastly, the node A assigns itself a physical address #3 and notifies this effect to the bus.

Next, the data transfer procedure will be described.

Data transfer becomes possible after the physical addresses are assigned. In the case of 1394 serial buses, however, prior to the data transfer, the root node arbitrates bus use privileges.

If a node wishes to start data transfer, it requests a bus use privilege to the parent node. The root node arbitrates requests for bus use privileges from respective nodes. Prior to data transfer, a node gained the bus use privilege designates a transfer rate and notifies one of 100, 200 and 400 Mbps to a transmission destination node.

Thereafter, in the case of isochronous communication, the transmission originating node starts data transfer at the designated channel immediately after it receives the cycle start packet transmitted synchronously with the communication cycle from the root node operating as a cycle master. The cycle master adjusts the time at each node as well as the transmission of the cycle start packet to the bus.

In the case of asynchronous communication for the transfer of control data such as commands, after the end of isochronous communication in each communication cycle, arbitration for asynchronous communication is performed and then data transfer starts from the transmission originating node to the transmission destination node.

Figure 7:
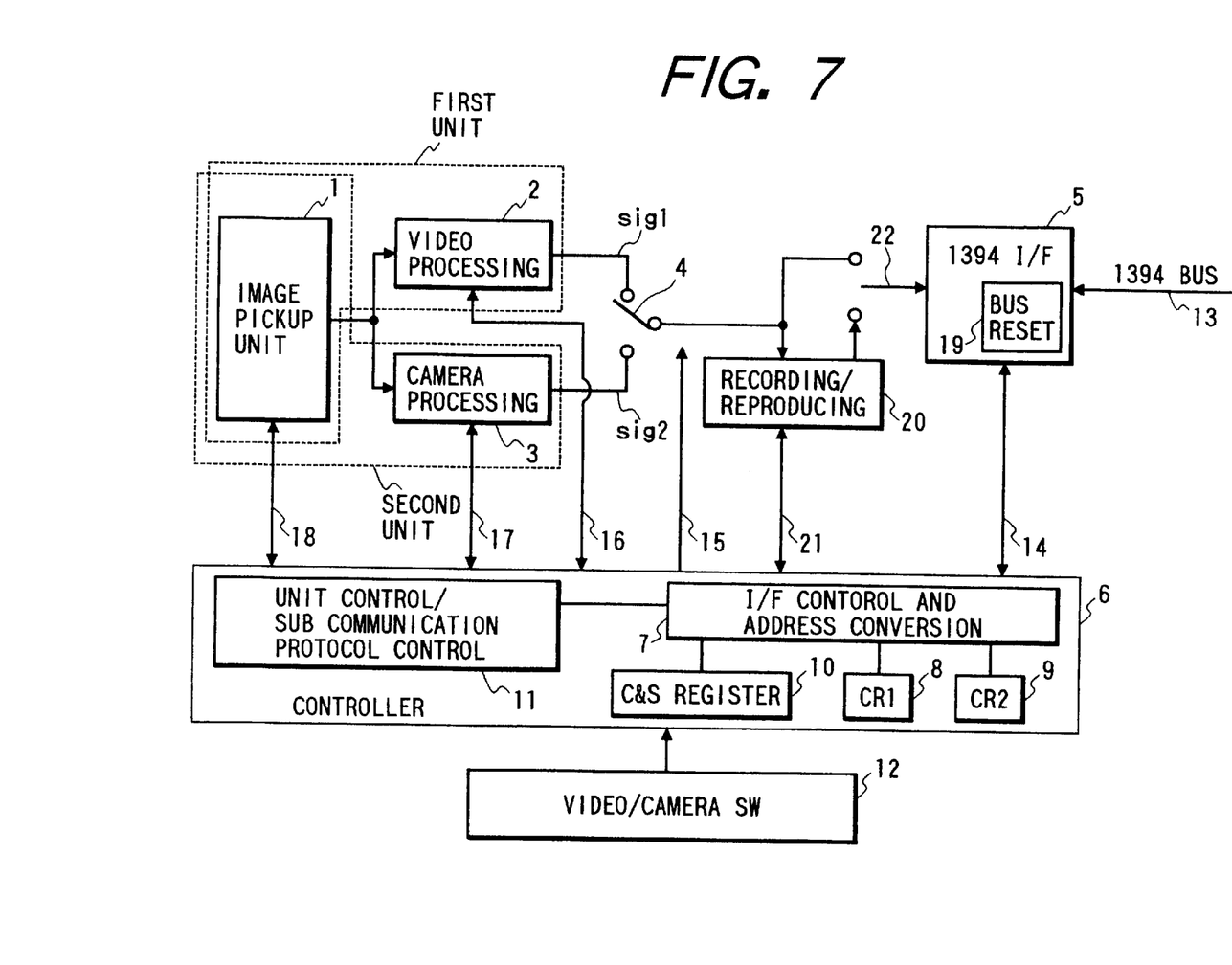
FIG. 7 is a diagram showing the detailed structures of a camera/recorder in the system shown in FIG. 5.

FIG. 7 is a system block diagram showing the detailed structure of the camera/recorder (CAM) shown in FIG. 5 as one example of the digital equipment of this invention.

In FIG. 7, reference numeral 1 represents an image pickup unit constituted of a lens, a CCD, fundamental image pickup circuits, and the like. The image pickup unit 1 picks up a subject image and executes camera signal processing such as adjustments of luminance and color of a picked-up image. Image data processed by the image pickup unit 1 is output in the format suitable for a video processing unit 2 and a digital camera processing unit 3.

The video processing unit 2 digitizes image data supplied from the image pickup unit 1 and executes a coding process for the compression of image data in accordance with a predetermined algorithm such as a DVC format compression scheme and a MPEG scheme. The video processing unit 2 also performs the conversion of image data format suitable for transmission.

The digital camera processing unit 3 digitizes image data supplied from the image pickup unit 1, performs image processing such as adjustments of an image size and sampling, and executes a coding process for the compression of image data in accordance with a JPEG scheme or the like. The digital camera processing unit 3 also performs the conversion of image data format suitable for transmission.

Reference numeral 4 represents a switch circuit for selecting either a moving image signal sig1 from the video processing unit 2 or a still image signal sig2 from the camera processing unit 3 and supplies it via another switch circuit 22 to a 1394 serial bus I/F circuit 5. This 1394 serial bus I/F circuit 5 includes a reset circuit 19 for a 1394 serial bus 13.

Image data supplied from the video processing unit 2 or digital camera processing unit 3 can be recorded or reproduced by a recording/reproducing unit 20 without being transmitted via the 1394 bus. The reproduced data may be transmitted via the 1394 bus. The recording/reproducing unit 20 includes recording media and other necessary equipments for recording/reproducing operations.

Reference numeral 6 represents a system control circuit (controller) which is constituted of a microcomputer, a memory and the like. The controller 6 has an I/F control and address conversion circuit 7 which transfers, between the controller 6 and 1394 I/F circuit 5, node information and command/status information contained in the data transmitted from the 1394 I/F circuit to the 1394 bus 13.

Reference numeral 8 represents a first configuration ROM (CR1) which constitutes the already-described configuration ROM. This first configuration ROM stores node information for a first protocol which is used for the transmission via the 1394 bus 13 of the moving image signal sig1 and its associated command/status information, the moving image signal being obtained by a digital moving image camera/recorder (first unit) realized by a combination of the image pickup unit 1 and video processing unit 2. Proper node information in this operation state of the equipment is stored in advance in the first configuration ROM 8 during the manufacture.

Reference numeral 9 represents a second configuration ROM (CR2). This second configuration ROM stores node information for a second protocol which is used for the transmission via the 1394 bus 13 of the still image signal sig2 and its associated command/status information, the still image signal being obtained by a digital still image camera/recorder (second unit) realized by a combination of the image pickup unit 1 and camera processing unit 3. Proper node information in this operation state of the equipment is stored in advance in the second configuration ROM 9 during the manufacture.

Reference numeral 10 represents a command/status register (C & S register) used by both the first and second units and storing unit control information. Reference numeral 11 represents a control unit for controlling the operations of the first and second units in accordance with commands loaded in the C & S register 10 and also for controlling subsidiary communication protocols.

The 1394 serial bus I/F circuit 5 and controller 6 constitute the interface control device of this embodiment.

Reference numeral 12 represents a video/camera switch which selects the operation of the electronic equipment of this embodiment as viewed from the 1394 bus 13, either as the digital moving image camera/recorder (first unit) or digital still image camera/recorder (second unit).

Reference numeral 14 represents a control signal and its command/status signal for the 1394 I/F circuit 5, reference numeral 15 represents a control signal for the switch circuit 4, reference numeral 16 represents a control signal for the video processing unit 2, reference numeral 17 represents a control signal for the camera processing unit 3, reference numeral 18 represents a control signal for the image pickup unit 1, and reference numeral 21 represents a control signal for the recording/reproducing unit 20.

Figure 8:
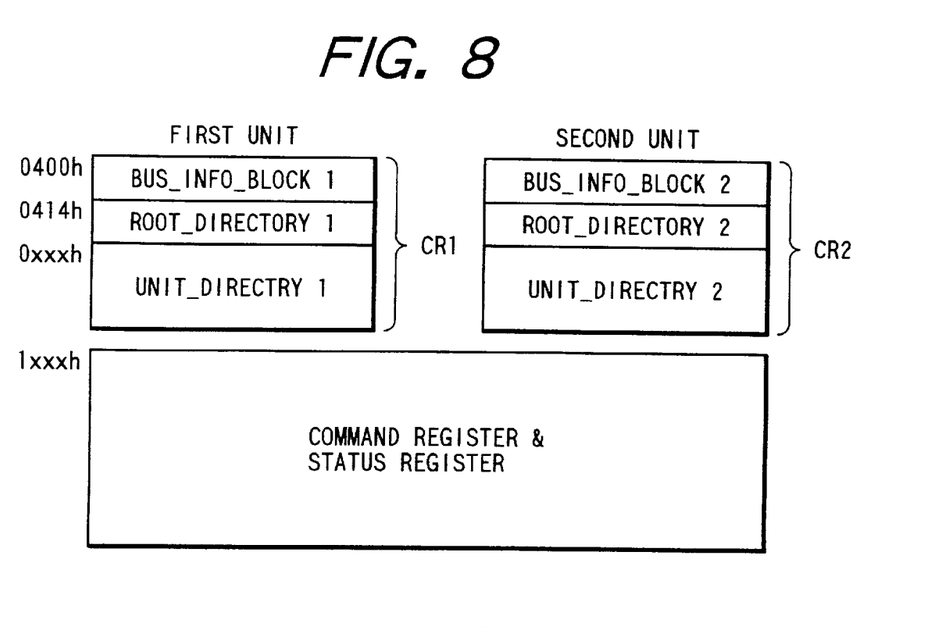
FIG. 8 is a diagram illustrating node information stored in a configuration ROM provided in the equipment shown in FIG. 7.

FIG. 8 is a diagram showing node information of CAM as viewed from the 1394 bus 13, the node information being mapped in the configuration ROM and the unit controlling command/status register. As shown, in this embodiment, the configuration ROM is constituted of the first and second configuration ROMs 8 and 9 (CR1, CR2).

Specifically, in this embodiment, in accordance with the status of the electronic equipment (whether it is used as the digital moving image camera/recorder or the digital still image camera/recorder), one of the first and second configuration ROMs 8 and 9 can be selected from the bus. Irrespective of which one of the configuration ROMs 8 and 9 is used, the C & S register 10 is used as the common area RAM.

Figure 9:
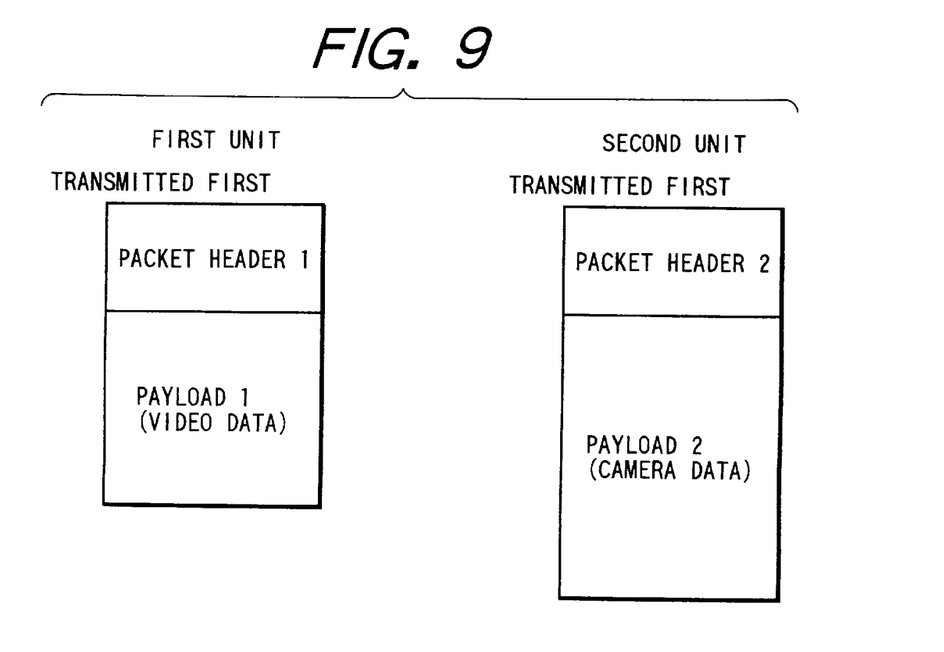
FIG. 9 is a diagram showing a data arrangement in a packet to be transmitted under each subsidiary communication protocol of the equipment shown in FIG. 7.

FIG. 9 shows the contents of data to be transmitted by a subsidiary communication protocol of the digital moving image camera/recorder (first unit) or digital still image camera/recorder (second unit), the data being arranged in a data packet transmitted by the 1394 fundamental communication protocol. Each packet is added with a packet header corresponding to the fundamental communication protocol of a 1394 serial bus, and data corresponding to each subsidiary communication protocol is added to a payload area.

With reference to FIGS. 7 to 9, an operation of the digital equipment as one example of this embodiment which changes from the digital moving image camera/recorder to the digital still image camera/recorder will be described.

It is assumed that the electronic equipment of this embodiment having the structure shown in FIG. 7 operates as the digital moving image camera/recorder and communicates with another node by supplying node information onto the 1394 bus 13 via the 1394 serial bus I/F circuit 5, under the first subsidiary communication protocol stored in the first configuration ROM (CR1) 8.

In this case, the compressed moving image signal sig1 obtained by the video processing unit 2 is the data in conformity with the SD format of the DVC format, i.e., the variable length coded data after discrete cosine transformed, and is a signal having the format corresponding to the video track with sub-code data and AUX data. Such a moving image signal sig1 is transmitted via the switch circuit 4 and 1394 I/F circuit 5 in the isochronous communication mode.

At the same time, in the asynchronous communication mode, command and status information for the control of the digital moving image camera/recorder is transmitted. A reception command is stored in the C & S register 10. In accordance with the stored reception command, the control unit 11 controls the video processing unit 2 by using the control signal 16.

In this state, the digital still image camera/recorder (second unit) is transparent from the 1394 serial bus 13. In this case, for example, the 1394 serial bus I/F circuit 5 can be used as a dubbing terminal of communication to another digital moving image camera/recorder. A subsidiary communication protocol used in this case is an IEEE 1394 AV/C protocol.

In contrast with the above, if a user uses the electronic equipment of this embodiment as the digital still image camera/recorder, it is may be used, for example, as a digital still image pickup equipment for an unrepresented personal computer. In this case, a protocol for the communication with this personal computer is a still image subsidiary communication protocol different from the AV/C protocol.

Figure 10A:
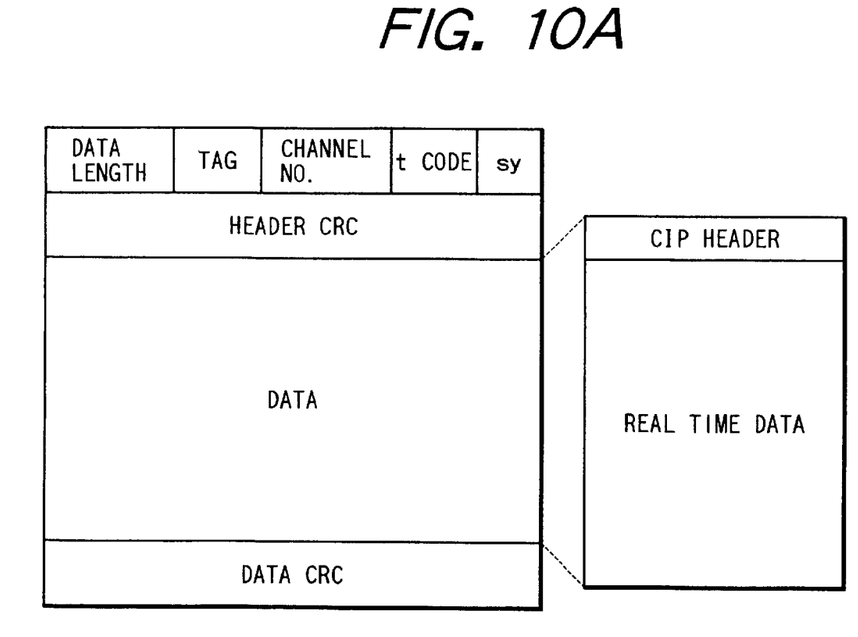
FIGS. 10A and 10B are diagrams showing the details of the data arrangement shown in FIG. 9.
Figure 10B:
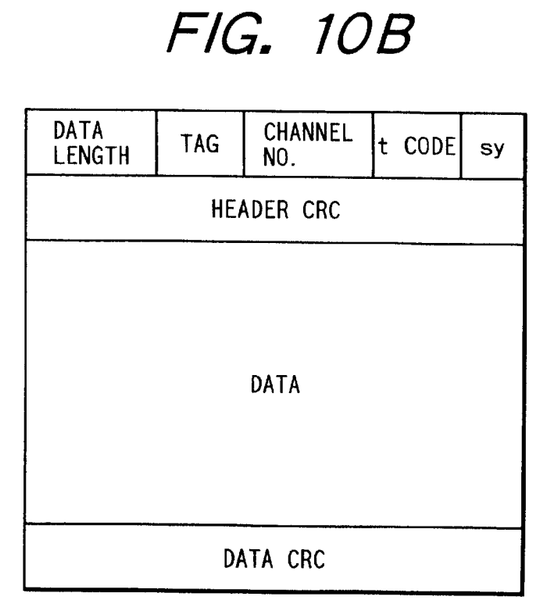

The outlines of an AV/C protocol and a digital still image protocol will be described. FIG. 10A shows the structure of an isochronous packet used by the AV/C protocol, and FIG. 10B shows the structure of an isochronous packet used by the digital still image protocol.

The AV/C protocol is a well known subsidiary communication protocol, and defines a real time data transfer protocol using 1394 isochronous data transfer and an isochronous data flow control. For the real time transfer, the AV/C protocol defines a CIP (Common Isochronous Packet). As shown in FIG. 10A, a CIP and real time (AV) data are stored in the data field of the isochronous packet.

The length of a source packet of the AV/C protocol is a fixed length specific to each equipment. The source packet is divided into one, two, four, or eight data blocks which are sequentially transmitted as a plurality of isochronous packets. The reception side uses a time stamp field in CIP for recovering real time data of the original packet from the divided isochronous packets.

While the equipment is under operation, an empty packet only with a packet header and a CIP header is transmitted even if there is no data to be transmitted.

The AV/C protocol prepares a FCP (Function Control Protocol) in order to control equipments on the 1394 serial buses. This FCP packet frame is transmitted by using an asynchronous packet for the control of transmission/reception of the control command.

As shown in FIG. 10B, the isochronous packet structure of the still image protocol is made to have a normal structure without a CIP and the like in the data field as in the case of the AV/C protocol. This data field stores data in the color signal format discriminated by the following modes.

Mode 0: YUV (4:4:4) format
Mode 1, Mode 3: YUV (4:2:2) format
Mode 2: YUV (4:1:1) format
Mode 4: RGB format
Mode 5: Y (Mono) format Eight-bit pixel data is stored for each of Y, U, V, R, G and B of the above format.

The still image protocol is structured to perform only data write from the transaction layer, without having FCP as in the case of the AV/C protocol.

The description will be given for the operation after the electronic equipment of this embodiment is switched from the digital moving image camera/recorder to the digital still image camera/recorder by activating the video/camera switch 12.

Upon detection of an activation of the video/camera switch 12, the controller 6 temporarily stops the bus control of the 1394 I/F circuit 5 in order to execute the resetting of the 1394 serial bus 13 and the reconfiguration of the bus management configuration.

The digital still image camera/recorder (second unit) is reconfigured and the C & S register 10 is set for use with the digital still image camera/recorder. Next, in order to change the node information of the 1394 serial bus I/F circuit 5 from the first configuration ROM 8 to the second configuration ROM 9, the address setting of the I/F control and address conversion circuit 7 is changed. Namely, since the configuration ROMs 8 and 9 are located at different addresses in the above-described address space, the address setting is changed to select the second configuration ROM 9.

Thereafter, in order to reconfigure the management configuration of the 1394 serial bus 13 under the reset state, the bus interconnection of the 1394 serial bus I/F circuit 5 is recovered. In this manner, the electronic equipment of this embodiment is newly defined as the digital still image camera/recorder having the still image subsidiary communication protocol, in accordance with the new bus management configuration and the node information in the second configuration ROM 9. This new definition is detected by the root node which controls the bus management of the system shown in FIG. 5, and therefore recognized by the system.

In operation of the electronic equipment of this embodiment as the digital still image camera/recorder, a partner node is generally and presumably a personal computer (PC). In such a case, an image signal picked up with the image pickup unit 1 is converted by the camera processing unit 3 into image data matching the format requested by PC. This image data is supplied as a baseband image signal sig2 to PC via the switch circuit 4, 1394 serial bus I/F circuit 5, and 1394 bus 13. In this case, the above-described still image subsidiary communication protocol is used.

At the same time, PC sends a command which is stored in the C & S register 10 to set the equipment as the digital still image camera/recorder. During this time, the digital moving image camera/recorder (first unit) is transparent from the 1394 serial bus 13.

Figure 11:
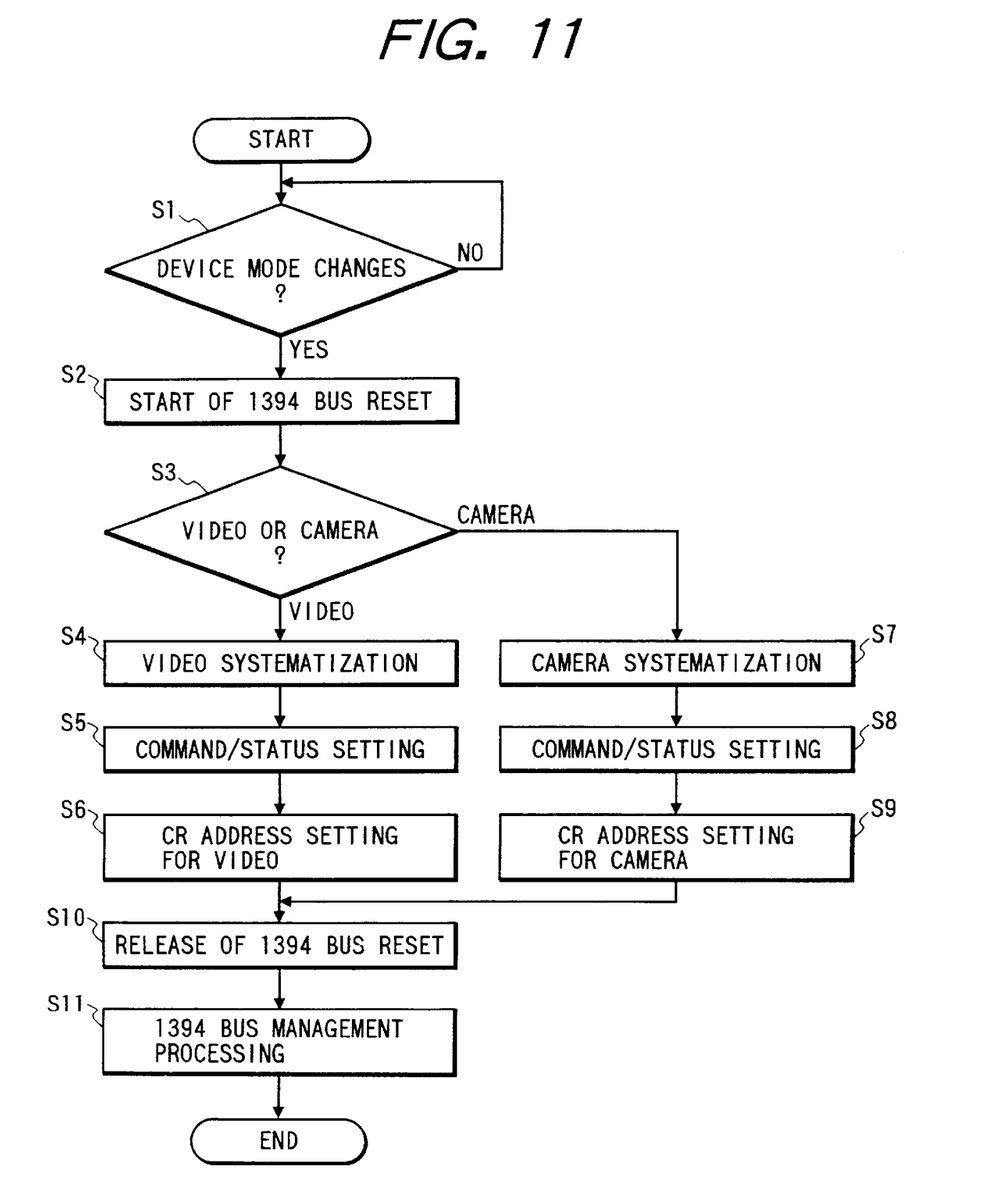
FIG. 11 is a flow chart illustrating the operation of selecting a function and a subsidiary communication protocol to be executed by the system shown in FIG. 5.

FIG. 11 is a flow chart illustrating the switching operation between the digital video (moving image) equipment and the digital camera (still image) equipment of the embodiment described above. The controller 6 has built-in software of this flow chart and the subsidiary communication protocols used for the communication by the first and second units.

Referring to FIG. 11, at Step S1 the controller 6 checks whether there is a change in the device mode, i.e., whether the video/camera switch 12 is activated. If a mode change is detected, the flow advances to Step S2 whereat the resetting operation of the 1394 serial bus 13 starts and the bus control by the 1394 serial bus I/F circuit 5 is temporarily stopped.

At Step S3 it is checked whether the digital equipment of this embodiment has been changed to the digital moving image camera/recorder (first unit) or to the digital still image camera/recorder (second unit) by the video/camera switch 12.

If changed to the digital video (moving image camera/recorder), the flow advances to Step S4 to perform the unit control corresponding to the system configuration of the digital video, at Step S5 the C & S register 10 is set for use with the digital video, and at Step S6 the address setting of the I/F control and address conversion circuit 7 is changed in order to set the node information of the 1394 serial bus I/F circuit 5 to have the information stored in the first configuration ROM 8.

If it is judged at Step S3 that the equipment has been changed to the digital camera (still image camera/recorder), the flow advances to Step S7 to perform the unit control corresponding to the system configuration of the digital camera, at Step S8 the C & S register 10 is set for use with the digital camera, and at Step S9 the address setting of the I/F control and address conversion circuit 7 is changed in order to set the node information of the 1394 serial bus I/F circuit 5 to have the information stored in the second configuration ROM 9.

After the processes at Steps S4 to S6 or Steps S7 to S9, the reset state of the 1394 serial bus 13 started at Step S2 is released to recover the bus connection of the 1394 serial bus I/F circuit 5. At Step S11 the root node executes a new bus management process after the system change and recognizes the equipment of this embodiment either as the moving image camera/recorder having the AV/C protocol or as the still image camera/recorder having the still image subsidiary communication protocol, in accordance with the contents of the configuration ROM 8 or 9.

As described so far in detail, according to the embodiment, different subsidiary communication protocols are selectively used to perform data communication via the 1394 serial bus I/F circuit 5. In this case, the equipment (having the structure such as shown in FIG. 5) having a plurality of units unable to operate at the same time is not required to have the C & S register independently for each unit. Even if the node information is required to be changed upon connection of a new equipment, the management configuration of the 1394 serial bus 13 can be reconfigured automatically.

As described above, the electronic equipment of this embodiment has configuration ROMs which store information on a plurality of functional units and a plurality of subsidiary communication protocols, and the system can selectively use one of a plurality of subsidiary communication protocols and one of a plurality of functional units.

Many widely different embodiments of the present invention may be constructed without departing from the spirit and scope of the present invention. It should be understood that the present invention is not limited to the specific embodiments described in the specification, except as defined in the appended claims.

What is claimed is:

1. A device for controlling a serial bus interface interconnecting a plurality of nodes, comprising:

storage means for storing a plurality of pieces of information representative of a plurality of functions provided by one of the plurality of nodes;

selecting means for selecting one piece of the plurality of pieces of function information stored in said storage means; and control means capable of outputting to the serial bus interface one piece of the plurality of pieces of function information selected by said selecting means, wherein a management condition of a serial bus is reset in response to that one piece of the plurality piece of function information selected by said selecting means is changed.

2. A device according to claim 1, wherein the plurality of pieces of function information are assigned different addresses, and said selecting means selects one of the different addresses.

3. A device according to claim 1, wherein said storage means further stores a plurality of pieces of protocol information representative of a plurality of subsidiary communication protocols corresponding to the plurality of different functions, and said control means can selectively execute the plurality of subsidiary communication protocols in addition to a fundamental communication protocol specific to the serial bus interface.

4. A device according to claim 3, wherein said selecting means further selects one piece of the plurality of pieces of protocol information, and said control means can output the protocol information selected by said selecting means to the serial bus interface.

5. A device according to claim 1, wherein the serial bus is used with the serial bus interface, and is in conformity with IEEE 1394 standards.

6. An electronic equipment connected to a serial bus interface, interconnecting a plurality of electronic equipment, comprising:

interface control means capable of executing a plurality of subsidiary communication protocols in addition to a fundamental communication protocol;

switching means for selectively executing the plurality of subsidiary communication protocols; and selecting means for reading from another electronic equipment one piece of a plurality of pieces of protocol information representative of the plurality of subsidiary communication protocols, wherein a management condition of a serial bus is reset in response to that one of the plurality of subsidiary communication protocols executed by said switching means is changed.

7. An electronic equipment according to claim 6, wherein the plurality of pieces or protocol information are assigned different addresses, and said selecting means selects one of the different addresses.

8. An electronic equipment according to claim 6, wherein the serial bus is used with the serial bus interface, and is in conformity with IEEE 1394 standards.

9. A device controlling a serial bus interface interconnecting a plurality of nodes, comprising:

control means capable of executing a plurality of subsidiary communication protocols in addition to a fundamental communication protocol;

switching means for selectively executing the plurality of subsidiary communication protocols; and selecting means for selectively reading from one of the plurality of nodes one piece of a plurality of pieces of protocol information representative of the plurality of subsidiary communication protocols, wherein a management condition of a serial bus is reset in that one of the plurality of subsidiary communication protocols executed by said switching means is changed.

10. A device according to claim 9, wherein the plurality of pieces of protocol information are assigned different addresses, and said selecting means selects one of the different addresses.

11. A device according to claim 9, wherein the serial bus is used with the serial bus interface, and is in conformity with IEEE 1394 standards.

* * * * *

UNITED STATES PATENT AND TRADEMARK OFFICE
CERTIFICATE OF CORRECTION

PATENT NO.    : 6,138,196
DATED         : October 24, 2000
INVENTOR(S)   : Nobutoshi Takayama, et al.

It is certified that error appears in the above-identified patent and that said Letters Patent is hereby corrected as shown below:

COLUMN 1
Line 66, "manufacture" should read --manfacturer--.

COLUMN 4
Line 67, "computers)." should read --computer), --.

COLUMN 5
Line 8, "set-are" should read --set are--.

COLUMN 11
Line 65, "plurality piece" should read --plurality of pieces--.

Signed and Sealed this

Twelfth Day of June, 2001

*Attest:*

*Attesting Officer*

NICHOLAS P. GODICI
*Acting Director of the United States Patent and Trademark Office*

UNITED STATES PATENT AND TRADEMARK OFFICE
CERTIFICATE OF CORRECTION

PATENT NO.   : 6,138,196
DATED        : October 24, 2000
INVENTOR(S)  : Nobutoshi Takayama, et al.

It is certified that error appears in the above-identified patent and that said Letters Patent is hereby corrected as shown below:

COLUMN 1
Line 66, "manufacture" should read --manfacturer--.

COLUMN 4
Line 67, "computers)." should read --computer), --.

COLUMN 5
Line 8, "set-are" should read --set are--.

COLUMN 11
Line 65, "plurality piece" should read --plurality of pieces--.

Signed and Sealed this

Twenty-sixth Day of June, 2001

*Attest:*

NICHOLAS P. GODICI
*Attesting Officer*   Acting Director of the United States Patent and Trademark Office